(12) United States Patent
Gore et al.

(10) Patent No.: US 11,124,429 B2
(45) Date of Patent: Sep. 21, 2021

(54) IRON COPPER COMPOSITIONS FOR FLUID PURIFICATION

(75) Inventors: Avinash Gore, Johnstown, PA (US); Bo Hu, Greensburg, PA (US); Sydney Luk, Cherry Hill, NJ (US)

(73) Assignee: HÖGANÄS AB (PUBL), Höganäs (SE)

( * ) Notice: Subject to any disclaimer, the term of this patent is extended or adjusted under 35 U.S.C. 154(b) by 505 days.

(21) Appl. No.: 13/810,259

(22) PCT Filed: Jul. 14, 2011

(86) PCT No.: PCT/EP2011/062060
§ 371 (c)(1),
(2), (4) Date: Feb. 12, 2013

(87) PCT Pub. No.: WO2012/007550
PCT Pub. Date: Jan. 19, 2012

(65) Prior Publication Data
US 2013/0140250 A1    Jun. 6, 2013

Related U.S. Application Data

(60) Provisional application No. 61/364,568, filed on Jul. 15, 2010.

(30) Foreign Application Priority Data

Jul. 15, 2010    (SE) .................................. 1050805-9

(51) Int. Cl.
*B01D 39/20*    (2006.01)
*B22F 1/00*    (2006.01)
(Continued)

(52) U.S. Cl.
CPC .............. *C02F 1/004* (2013.01); *B01D 15/00* (2013.01); *B01J 20/02* (2013.01);
(Continued)

(58) Field of Classification Search
CPC ................ B01D 15/00; B01D 39/2027; B01D 39/2031; B01D 39/2034; B01D 39/2037;
(Continued)

(56) References Cited

U.S. PATENT DOCUMENTS 3,759,709 A * 9/1973 Asbury ..................... B22F 3/11
                                                      419/2
4,642,192 A * 2/1987 Heskett .................... C02F 1/705
                                                      210/638

(Continued)

FOREIGN PATENT DOCUMENTS

DE    1960471 A1 * 9/1970 ............... C22B 5/00
EP    1 273 371 A2    1/2003
(Continued)

OTHER PUBLICATIONS

G. K. Narula et al., Materials Science (1988), Tata McGraw-Hlll, pp. 347-352 (reprint 2007).*
(Continued)

*Primary Examiner* — Walter D. Griffin
*Assistant Examiner* — Angel Olivera
(74) *Attorney, Agent, or Firm* — Buchanan Ingersoll & Rooney P.C.

(57) ABSTRACT

The present invention concerns a filtering medium, a method for the production thereof, the use of said filtering medium and a method for reducing the content of multiple contaminants simultaneously in fluids by means of said filtering medium through a physical barrier, a chemical process or biological process, wherein said filtering medium consists of or comprises at least one of the following: a mixture (A) containing a major part of an iron-based powder and a minor part of a copper based powder, an iron-copper powder alloy (B), and an iron-based porous and permeable composite containing copper (C).

13 Claims, 3 Drawing Sheets

(51) Int. Cl.

| | |
|---|---|
| *C02F 1/00* | (2006.01) |
| *B01D 15/00* | (2006.01) |
| *B01J 20/02* | (2006.01) |
| *B01J 20/28* | (2006.01) |
| *B22F 5/10* | (2006.01) |
| *C02F 1/28* | (2006.01) |
| *C22C 1/08* | (2006.01) |
| *C22C 33/02* | (2006.01) |
| *C02F 103/06* | (2006.01) |

(52) U.S. Cl.
CPC ... *B01J 20/28004* (2013.01); *B01J 20/28011* (2013.01); *B01J 20/28042* (2013.01); *B01J 20/28057* (2013.01); *B22F 1/0003* (2013.01); *B22F 5/10* (2013.01); *C02F 1/281* (2013.01); *C22C 1/08* (2013.01); *C22C 33/0257* (2013.01); *B01D 39/2027* (2013.01); *B01D 39/2031* (2013.01); *B01D 39/2034* (2013.01); *B01D 39/2037* (2013.01); *B01J 2220/42* (2013.01); *B22F 2999/00* (2013.01); *C02F 2103/06* (2013.01); *C02F 2303/04* (2013.01)

(58) Field of Classification Search
CPC .... B01J 20/02; B01J 20/0229; B01J 20/0237; B01J 20/28004; B01J 20/28011; B01J 2220/42; B01J 2220/0003; B01J 20/28057; B01J 20/28042; B22F 1/0003; B22F 1/0059; B22F 3/11; B22F 3/10; B22F 5/10; B22F 2999/00; C02F 1/281; C02F 1/004; C02F 2103/06; C02F 2303/04; C22C 1/08; C22C 33/02; C22C 33/0257; C22C 38/16; C22C 1/04

See application file for complete search history.

(56) References Cited

U.S. PATENT DOCUMENTS

| | | | |
|---|---|---|---|
| 5,534,154 A | 7/1996 | Gillham | |
| 6,303,039 B1 | 10/2001 | Back et al. | |
| 6,322,701 B1 | 11/2001 | Delighiannis | |
| 6,827,757 B2 | 12/2004 | Ozaki et al. | |
| 2007/0241063 A1* | 10/2007 | St-Laurent | B09C 1/002 |
| | | | 210/758 |
| 2010/0054982 A1 | 3/2010 | Larsson | |

FOREIGN PATENT DOCUMENTS

| | | | | |
|---|---|---|---|---|
| JP | S59166210 A | 9/1984 | | |
| JP | S62193693 A | 8/1987 | | |
| JP | H0293006 A | 4/1990 | | |
| JP | H1085531 A | 4/1998 | | |
| JP | 11-235577 A | 8/1999 | | |
| JP | 2000005740 A | 1/2000 | | |
| JP | 2000170145 A | 6/2000 | | |
| JP | 2001009475 A | 1/2001 | | |
| JP | 2001504032 A | 3/2001 | | |
| JP | 20022161263 A | 6/2002 | | |
| JP | 2004149829 A | 5/2004 | | |
| JP | 2007136406 A | 6/2007 | | |
| JP | 2008062184 A | 3/2008 | | |
| JP | 2009072742 A | 4/2009 | | |
| JP | 2009226348 A | 10/2009 | | |
| JP | 2010-017219 A | 1/2010 | | |
| JP | 2010017219 A * | 1/2010 | | |
| WO | WO 9704868 A1 * | 2/1997 | | B01J 23/72 |
| WO | 9821149 A1 | 5/1998 | | |
| WO | WO 03/076341 A2 | 9/2003 | | |
| WO | WO 2008/129551 A1 | 10/2008 | | |

OTHER PUBLICATIONS

G. K. Narula et al., Materials Science, Tata McGraw-Hlll, 1988, pp. 347-352 (reprint 2007).*

Yoshikazu Masai et al., "Evaluation on Mechanical Properties and Functionalities of Anti-Bacteria and Resist-Corrosion for Cu-Added Stainless Steel (SUS304L) by MIM", Journal of the Japan Society of Powder Metallurgy, vol. 49, No. 9, Sep. 2002, pp. 834-840, XP-002661798.

T.M.P. Frota et al., "Microstructure of Plasma-Sintered Aluminum Bronze Powder Compacts", Material Science Forum, vols. 530-531, 2006, pp. 133-139, XP-008144441.

Nairuo Zhu et al., "Effective Dechlorination of HCB by Nanoscale Cu/Fe Particles", Journal of Hazardous Materials, vol. 176, No. 1-3, Apr. 15, 2010, pp. 1101-1105, XP-026867767.

International Search Report (PCT/ISA/210) dated Oct. 31, 2011, by the European Patent Office as the International Searching Authority for International Application No. PCT/EP2011/062060.

Written Opinion (PCT/ISA/237) dated Oct. 31, 2011, by the European Patent Office as the International Searching Authority for International Application No. PCT/EP2011/062060.

Office Action (Communication pursuant to Article 94(3) EPC) dated Jan. 3, 2019, by the European Patent Office in corresponding European Application No. 11 743 468.8-1103, 9 pages.

Li, M. et al."Comparison of Particle Size Distributions Measured Using Different Techniques" Particulate Science and Technology,Copyright @ Taylor & Francis Inc., vol. 23, No. 3, Feb. 24, 2007, pp. 265-284, XP055269915.

Japanese Search Report by Registered Searching Organization dated Mar. 2, 2015, issued by the Japanese Patent Office in corresponding Japanese Application No. 2013-519104, (32 pages).

Japanese Search Report by Registered Searching Organization dated Feb. 28, 2017, issued by the Japanese Patent Office in corresponding Japanese Application No. 2016-061720, (35 pages).

Office Action (Communication pursuant to Article 94(3) EPC) dated Sep. 26, 2019, by the European Patent Office in corresponding European Application No. 11 743 468.8-1103, (9 pages).

* cited by examiner

Column: φ25xH200 mm
Composite: φ25xH20 mm
Water: 100 ml
Air pressure: 0~20 psi
(0~0.138 MPa)

IRON COPPER COMPOSITIONS FOR FLUID PURIFICATION

FIELD OF THE INVENTION

The present invention relates to a filtering medium, a method for the production thereof, use of said filtering medium and a method for reducing the content of multiple contaminants simultaneously in fluids by means of said filtering medium through a physical barrier, a chemical process and/or biological process.

BACKGROUND OF THE INVENTION

Toxic inorganic/organic substances in various water sources have to be reduced below regulated levels before the water goes into drinking water systems or is released into recipients.

Nitrate($NO_3^-$) is a common inorganic contaminant found in groundwater in the areas where agriculture activities occur heavily. Nitrates usually come from fertilizers, used in farming and gardening in order to provide the plants and shrubs with nutrients.

Other contaminants which may be generated from such activities are phosphates ($PO_4^{3-}$) and traces of pesticides such as atrazine. Accumulation of fertilizers is a problem as they can go through the soil and contaminate ground water systems. Both shallow water wells and deep water wells can be affected.

Toxic metals such as arsenic (As), chromium (Cr), whereof its oxidation state +6 ($Cr^{VI}$) is regarded as most harmful, lead (Pb), mercury (Hg), cadmium (Cd), selenium (Se), etc, other substances as chlorinated hydrocarbons and other organic substances, sometimes measured as Total Organic Carbon (TOC) are generated either from natural origins or from industrial or farming activities.

Other types of contaminants that may be present in the water are microorganisms, such as bacteria.

A conventional method for killing bacteria is the use of the chlorination process where chlorine containing chemical substances is added to the water for disinfection. Chlorine is a highly efficient disinfectant, however one of the drawbacks with this process is the remaining chlorine compounds in the water, such as $ClO^-$ ions which can cause health problems.

In order to reach acceptable levels of contaminants in drinking water, several processes are currently used.

Reverse osmosis is based on the process of osmosis. This involves the selective movement of water from one side of a membrane to the other. This technique is also very energy consuming.

The ion exchange process percolates water through bead-like spherical resin materials (ion-exchange resins). Ions in the water are exchanged for other ions fixed to the beads. Microorganisms can attach to the resins, providing a culture medium for rapid bacterial growth and subsequent pyrogen generation. This technique has a low initial capital investment but a high long-term operational cost.

One of the above techniques is usually applied to target one, or in some cases two contaminants present in the water. This means that several techniques often need to be applied following each other, in a chain process. In order to increase the efficiency, reducing costs, it would be desirable to purify the water from several contaminants in one single step. However, today there are few products available in the market capable of effectively purifying water from multiple contaminants simultaneously.

US patent publication no. 2007/0241063A1 describes a process for treating water contaminated with a volatile organic compound with iron powder granules containing iron, carbon and oxygen.

U.S. Pat. No. 5,534,154 describes a procedure for treating contaminated water by passing the water containing contaminant in solution through a permeable body of treatment material comprising particles of an adsorptive material physically mixed with particles of metal. The iron metal particles mentioned in the patent are iron fillings generally in solid granular form. The procedure requires a negative Eh voltage which in turn demands oxygen exclusion.

U.S. Pat. No. 6,827,757 describes a magnetite-iron based composite with very small average particle size of 0.05-10 µm.

EP 1273371A2 describes an iron powder adapted to remediate selected media by dehalogenating halogenated hydrocarbons in the media comprising iron powder particles and inorganic compounds. Said inorganic compounds should have a very low electric resistivity, and are preferably selected from the group consisting of Ca, Ti, V and Cr. Said inorganic compounds should be present on at least a portion of the surface of each particle.

WO 2008/129551 discloses a liquid filter medium comprising carbonaceous material, a water-insoluble metal oxide or hydroxide, and at least one of chitosan and an ion exchanger.

U.S. Pat. No. 4,642,192 discloses a method of reducing the concentration of inorganic chlorine by passing water through a bed of metal particles, brass. This method shows insignificant effect on reduction of nitrate.

U.S. Pat. No. 6,303,039 discloses a formulation comprising at least two biocide metals and at least one chelating agent, wherein said formulation dissolves over a period of months or longer.

WO 03/076341 describes a system for control of bacterial growth in water comprising antimicrobial treatment media within a containment vessel, the treatment media including one or more of transition metals and transition metal oxides.

SUMMARY OF THE INVENTION

It is previously known that copper containing powder can kill bacteria but have very little effect on the reduction of nitrate. It is also previously known that iron containing powders can only reduce insignificant amounts of nitrate and chlorine.

The inventors of the present invention have now surprisingly found that provided a special type of iron powder is used significant amounts of chlorine can be reduced.

Furthermore, by using a combination of copper and iron in powder form a synergetic effect is obtained which is shown in a surprisingly enhanced capability of reducing nitrate. Thus such combination can reduce significant amounts of bacteria, chlorine and nitrate simultaneously. The synergetic effect can be achieved by optimizing the combination through choosing the type of iron powder, determining the amount of copper, and the method of preparing the iron-based filtering medium containing copper.

Chlorine that may be removed according to the present invention may be in the form of inorganic chlorine containing compounds such as hypochlorite ($ClO^-$), chlorite ($ClO_2^-$), chlorine dioxide ($ClO_2$), chlorate ($ClO_3^-$), or perchlorate ($ClO_4^-$). The filtering medium according to the present invention may also be used for reducing other contaminants such as nitrites, heavy metals, such as As, Pb, Hg, toxic organic and inorganic compounds, other microorganisms or combinations thereof.

The present invention relates to a filtering medium, wherein said filtering medium comprises iron and copper in a form chosen from at least one of:
- a mixture (A) containing a major part of an iron-based powder and a minor part of a copper based powder,
- an iron-copper powder alloy (B), and
- a copper containing iron-based porous and permeable composite (C).

The present invention also relates to a method for reducing the content of contaminants in fluids by means of said filtering medium, through a physical barrier, a chemical process and/or biological process, said method comprising the steps of:
a) providing a filtering medium comprising iron and copper in a form chosen from at least one of:
- a mixture (A) containing a major part of an iron-based powder and a minor part of a copper based powder,
- an iron-copper alloy (B), and—a copper containing iron-based porous and permeable composite (C), b) bringing one or more contaminated fluid(s) in contact with the filtering medium to reduce the content of contaminants (purify) in said one or more fluid(s),
c) optionally removing the filtering medium from the one or more fluid(s) with a reduced content of contaminants.

Further, the present invention relates to a method for producing a filtering medium comprising iron and copper in a form chosen from at least one of:
- a mixture (A) containing a major part of an iron-based powder and a minor part of a copper based powder,
- an iron-copper alloy (B), and—a copper containing iron-based porous and permeable composite (C), wherein
the mixture (A) is obtained by mixing atomized, H2-reduced or CO-reduced iron powder with at least one of essentially pure Cu powder particles and Cu-alloy powder particles,
the iron-copper alloy (B) is obtained by directly atomizing molten iron prealloyed with copper or diffusion alloying iron-based powder particles with copper powder particles; or by diffusion bonding copper containing powder particles to an iron-based powder; or mechanically alloying iron-based powder particles with copper powder particles,
the copper containing iron-based porous and permeable composite (C) is obtained by subjecting a mixture (A) containing a major part of an iron-based powder and a minor part of a copper based powder, or an iron-copper powder alloy (B), to: compaction and/or heat treatment and optionally followed by sizing.

The filtering medium according to the present invention may be used as a filtering medium in a fluid, preferably a water containing fluid, more preferably ground water, river water, industrial waste water, civic waste water and/or surface water for reducing the content of contaminants selected from the group consisting inorganic chlorine containing compounds, nitrates, nitrites, heavy metals, toxic inorganic substances, toxic organic compounds, microorganisms and/or combinations thereof in the fluid. If the fluid to be treated according to the present invention has already been treated with inorganic chlorine containing compounds to kill bacteria, some bacteria may survive such a chlorine treatment. In that case, the use of a filter medium according to the present invention may kill the remaining bacteria present in the fluid. The filter medium is then also able to remove the inorganic chlorine compounds present in the fluid after said chlorine treatment.

DETAILED DESCRIPTION OF THE PRESENT INVENTION

Mixture (A)

Figure 1:
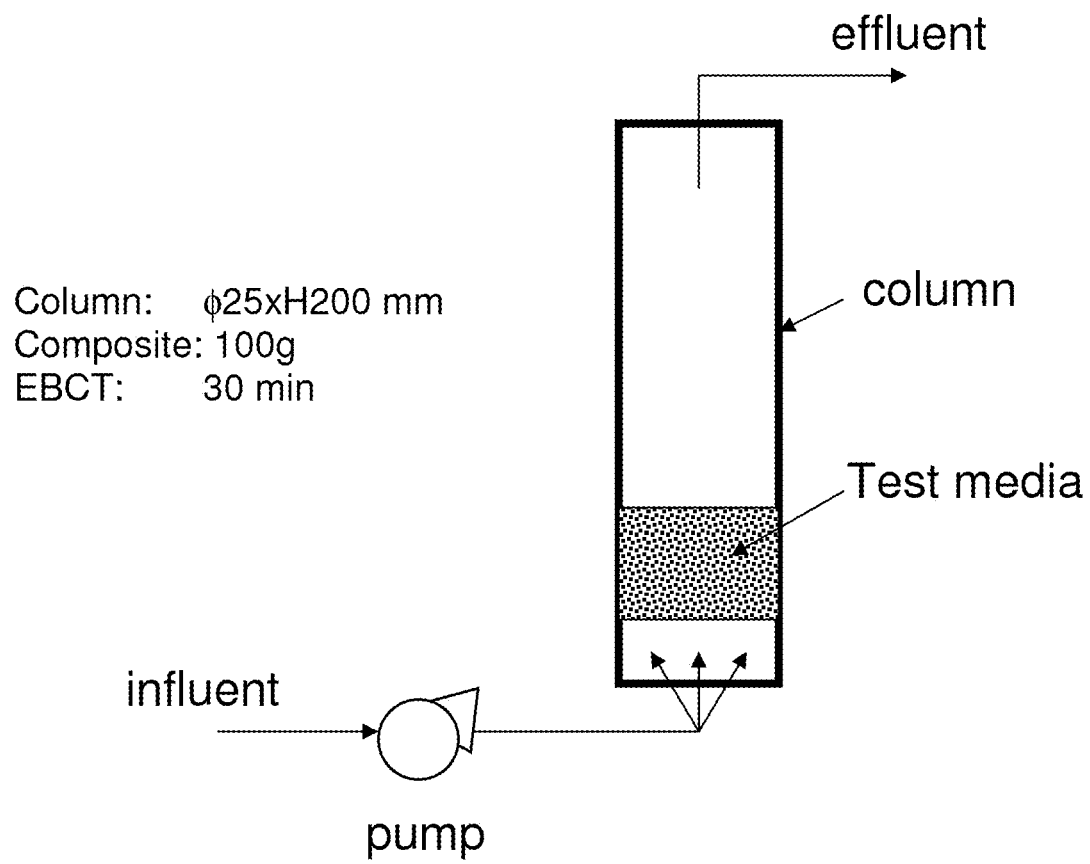
FIG. 1 shows a schematic drawing of a column used for evaluating the performance of the filtering medium according to the invention.
Figure 2:
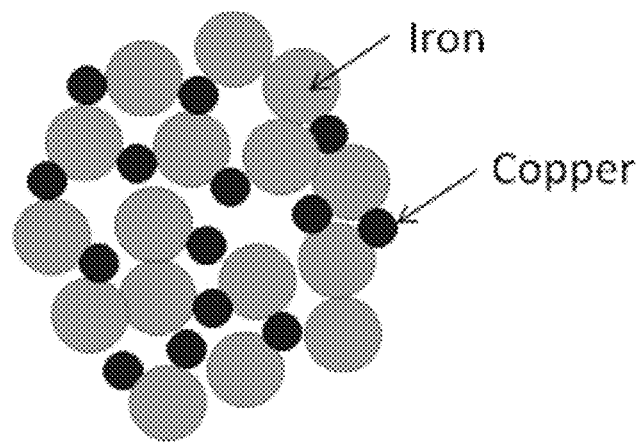
FIG. 2 shows a schematic picture of a permeable and porous composite particle according to the invention, where copper are slightly bonded on iron particles to form a composite particle with high porosity.
Figure 3:
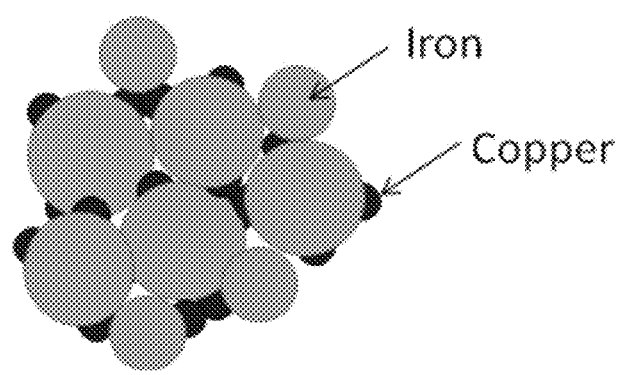
FIG. 3 shows a schematic picture of a conventional Fe—Cu diffusion bonded composite, where copper in melted form is diffused into iron body to form dense particles that are required in structural component applications.

In one embodiment of the present invention the filtering medium for treatment of contaminated fluids consists of or comprises a mixture, (A), containing a major part of an iron-based powder and a minor part of a copper based powder. This mixture is characterized in that it contains between 2 and 20% of copper, by weight of the mixture. The amount of copper required depends on the type of iron powder used.

When using an atomized iron powder, the amount of copper in the mixture should be 2-20% by weight. If a hydrogen reduced iron powder is used in the mixture the amount of copper should be 2-10% by weight, and if a CO— reduced iron powder is used the amount of copper should be 10-20% by weight of the mixture.

Besides the above mentioned types of iron powders, iron fillings or equivalent powders may also be of interest.

The mixture (A) is typically produced by mixing iron-based powder particles with copper-containing powder particles in a mixer, until the copper particles have been homogenously distributed throughout the mix. The mixing may be performed in an ordinary mixer, such as a Z-blade mixer, cone mixer, ribbon mixer or high speed mixer for a period of time between 0.5 min and 8 hours, preferably 1 minute to 5 hours or 30 min to 3 hours.

The iron-based powder particles used may originate directly from atomization of molten iron i.e. gas atomization and water atomization of molten iron, chemical reduction of iron oxides such as CO-reduction or H2-reduction of iron oxides. Said production processes are the most common powder production routes in the industry today, However, the iron-based powder particles according to the invention could originate from other production processes providing particles similar to those of the processes mentioned above.

In general, atomized powder particles contain less internal porosity than particles produced by chemical reduction. The particle morphology and sizes also varies depending on the production process. Due to these differences atomized particles often have higher apparent densities than chemically reduced particles, such as apparent densities above 2.5 g/cm$^3$ or above 2.8 g/cm$^3$.

Iron-based powders produced with H2-reduction usually have low apparent densities, such as less than 2.0 g/cm$^3$ or less than 1.8 g/cm$^3$.

Iron-based powders produced with CO-reduction usually have an apparent density between the two mentioned above, such as between 1.8 and 2.8 g/cm$^3$, or between 2.0 and 2.5 g/cm$^3$.

In similar fashion there are also differences regarding the specific surface areas (BET). Atomized powders have low surface area, such as less than 0.1 m$^2$/g, CO-reduced powders generally have surface areas between 0.1 and 0.18 m$^2$/g, and H2-reduced powders generally have surface areas above 0.18 m$^2$/g.

The differences in the powder particle morphology, density, porosity, surface area etc, affect the performance of the filter media according to the invention, and are (for the sake of simplicity) referenced by specifying the production route in the present application. However, it is important to point out, that it is the particle properties and not the production route that affect the properties of the filter media. Thus, any other technique that provides iron-based powder particles with properties similar to those mentioned above should be understood to be included in the embodiments of the current application.

In one embodiment porous iron-based particles are used, such as in the case of chemically reduced iron powder particles. During mixing with copper containing particles these particles may be forced into the pores of the iron-based particles, and become locked in the structure when the copper containing particles have sufficient small particle diameter.

Also other types of particles, such as activated carbon, activated alumina and zeolites, may be added before mixing. These particles should be small enough so that they may also be forced into the pores of the iron-based particles, and become locked in the structure, rendering the product enhanced properties for reducing contaminants. The added amount of said other types of particles should be 0.01-10%, preferably 0.05-8%, more preferably 0.10-5% by weight of the mixture.

The iron-based powder may have an average particle size between 10 mm and 1 μm, preferably between 5 mm and 20 μm and most preferably between 2 mm and 45 μm but is not to be interpreted as limited to these particle sizes.

The average particle size means that 50% of the particles by weight have particle sizes less than the average particle size and 50% by weight of the particles have particle sizes above the average particle size. The average particle size may be determined by standard sieve analysis according to SS-EN 24497 or by Laser Diffraction according to SS-EN 13320-1.

In a preferred embodiment, the iron-based powder particles have a content of iron (Fe) of more than 90% iron, preferably more than 95%, maximum 2% by weight of the particles above 850 μm and maximum 12% by weight of the particles below 45 μm.

The copper containing powder particles are preferably selected from the group consisting of essentially pure Cu and Cu-alloys, such as Fe—Cu, Cu—Sn, Cu—Zn, Cu—Al, Cu—Si, Cu—Ni, and the like. A preferred Cu-alloy is Fe—Cu.

The copper containing powder particles may have an average particle size between 10 mm and 1 μm, preferably between 5 mm and 20 μm and most preferably between 2 mm and 45 μm but is not to be interpreted as limited to these particle sizes.

In one embodiment iron-based powder with a content of iron of more than 90% by weight, preferably more than 95% weight, is mixed with a Fe—Cu alloy, wherein said Fe—Cu alloy consists of Cu-particles that have been diffusion-bonded or diffusion alloyed to iron particles and said Fe—Cu alloy comprises 5-25% by weight of copper.

In one embodiment of the present invention the filtering medium comprises the mixture (A) wherein the mixture comprises:

1) atomized iron powder with an average particle size between 10 mm and 1 μm, and with an Fe-content of at least 90% by weight of the iron powder and at least one of essentially pure Cu powder particles and Cu-alloy powder particles, and wherein the mixture (A) contains between 2 and 20% Cu, by weight;

2) H2-reduced iron powder with an average particles size between 10 mm and 1 μm, and with an Fe-content of at least 90% by weight of the iron powder and at least one of essentially pure Cu powder particles and Cu-alloy powder particles, and wherein the mixture (A) contains between 2 and 10% Cu, by weight; or 3) CO-reduced iron powder with an average particles size between 10 mm and 1 μm, and with an Fe-content of at least 90% by weight of the iron powder and—at least one of essentially pure Cu powder particles and Cu-alloy powder particles, and wherein the mixture (A) contains between 10 and 20% Cu, by weight.

Preferably the mentioned Cu-alloy powder particles contain Fe—Cu powder particles, more preferably they consist of Fe—Cu powder particles.

Iron-Copper Powder Alloys (B)

In one embodiment of the present invention the filtering medium consists of or comprises iron-copper powder alloy(s).

The iron-copper powder alloy(s) according to the invention may have a particle size range between 10 mm and 1 μm, preferably between 5 mm and 20 μm and most preferably between 2 mm and 45 μm but is not to be interpreted as limited to these particle sizes.

In one embodiment the iron-copper alloy originates directly from atomization of molten iron i.e. gas atomization and water atomization of molten iron and optional additives. Copper is in this case prealloyed to iron in the melt.

Alternatively, copper may be prealloyed through diffusion alloying, solid state diffusion in iron-based particles. Said iron based particles may originate directly from atomization of molten iron i.e. gas atomization and water atomization of molten iron, or chemical reduction of iron oxides such as CO-reduction or H2-reduction. In both cases, i.e. copper is prealloyed to iron in the melt and copper is prealloyed through diffusion alloying, copper will be present in the matrix of the iron-based particles, thus forming an iron-copper alloy. The amount of copper in the alloy is in this embodiment 2-20% by weight. The copper particles used in the diffusion alloying process may originate from pure Cu; Cu-alloys such as Fe—Cu, Cu—Sn, Cu—Zn, Cu—Al, Cu—Si, Cu—Ni; Cu-oxides; Cu-salts; and/or the like.

In another embodiment the iron-copper alloy may be produced by diffusion bonding, in which case copper particles are bonded by diffusion to the surface of iron-based particles. The amount of copper in the alloy in this embodiment is 2-20%. Said iron based particles may originate directly from atomization of molten iron i.e. gas atomization and water atomization of molten iron, or chemical reduction of iron oxides such as CO-reduction or H2-reduction. The copper particles used in the diffusion bonding process may originate from pure Cu; Cu-alloys such as Fe—Cu, Cu—Sn, Cu—Zn, Cu—Al, Cu—Si, Cu—Ni; Cu-oxides; Cu-salts; and/or the like.

In this context the term "diffusion bonding" means that the copper particles are merely bonded to the surface of the iron-based particles by thermal diffusion, whereas the term "diffusion alloying" means that the copper particles are partially or completely alloyed into the iron particles. Diffusion alloying requires a higher furnace temperature.

In another embodiment the iron-copper alloy may be produced by mechanical alloying copper particles with iron particles.

Mechanical alloying is a solid-state powder processing technique involving repeated cold welding, fracturing, and re-welding of powder particles in a high-energy mill. Said iron based particles may originate directly from atomization of molten iron i.e. gas atomization and water atomization of molten iron, or chemical reduction of iron oxides such as CO-reduction or H2-reduction. The copper content in this case is 2-10% by weight. The copper particles used in the mechanical bonding process may originate from pure Cu and/or Cu-alloys such as Fe—Cu, Cu—Sn, Cu—Zn, Cu—Al, Cu—Si, Cu—Ni, and/or the like. A preferred Cu-alloy is Fe—Cu.

Iron-Based Porous and Permeable Composite Containing Copper (C)

In one embodiment of the present invention the filtering medium for treatment of contaminated fluids consists of or comprises an iron-based porous and permeable composite containing copper.

Said composite can be manufactured into various forms, such as chip, flake, block or pellet, by subjecting the iron-copper alloy (B) or the iron-based powder-copper containing mixture (A) to common powder metallurgical technologies.

The use of the wording "permeable" as disclosed herein is to be interpreted as a composite or an iron-based powder body being constructed so that it is permeated or penetrated, especially by liquids or gases.

The use of the wording "porous" as disclosed herein is to be interpreted as a composite or an iron powder or body being constructed so that it is admitting the passage of gas or liquid through pores or interstices.

Thus, the iron-based porous and permeable composite containing copper (C) according to the present may comprise copper containing particles located in pores and cavities of the composite.

It is preferred that the filter medium according to the present invention comprises a copper containing iron-based porous and permeable composite (C). Naturally, preferred embodiments of the disclosed mixture (A) and/or alloy (B) making up said composite (C) are most preferred. For example a filter medium according to the present invention may also contain different combinations of the material disclosed previously: (1) a copper containing iron-based porous and permeable composite (C) and a mixture (A) containing a major part of an iron-based powder and a minor part of a copper based powder; (2) a copper containing iron-based porous and permeable composite (C) and an iron-copper alloy (B); or (3) a combination of all three a mixture (A) containing a major part of an iron-based powder and a minor part of a copper based powder, an iron-copper alloy (B), and a copper containing iron-based porous and permeable composite (C).

Preparation of the Permeable and Porous Composite

The iron-based powder mixture (A) or the iron-copper alloy (B) can be subjected to compaction and/or thermal treatment optionally followed by sizing to produce an iron-based porous and permeable composite containing copper. Thus, the copper containing iron based porous and permeable composite (C) can be obtained by (1) compaction and optional sizing, (2) compaction, thermal treatment and optional sizing, or (3) thermal treatment and optional sizing. Preferably compaction is a part of the production process of said composite (C).

Compaction is usually performed at pressures below 1000 MPa, preferably below 600 MPa, e.g. 10-1000 MPa, 20-800 MPa or 20-600 MPa, to achieve a compacted density of about or less than 7.0 g/cm$^3$ to form desired shapes, such as blocks, granules or pellets. Preferably the compacted density is between 2.5-7.0 g/cm$^3$, preferably 4-6 g/cm$^3$ depending of type of iron-based powder used. Preferably the compacting has an uniaxial compaction movement.

Thermal treatment usually involves temperatures below 1200° C., below 1000° C., or below 800° C., depending on the types of materials (A) or (B) used, in a reducing or inert atmosphere. The thermal treatment temperature is usually above 300° C., preferably above 400° C. Temperature intervals of interest are especially 300-1200° C., 400-1200° C., 300-1000° C., 400-1000° C., 300-800° C., 400-800° C., 300-700° C., 400-700° C., 300-600° C., 400-600° C., 300-500° C. and 400-500° C. The temperature for the thermal treatment is always lower than the melting point of the copper containing powder material.

Sizing or gently grinding is usually performed after heat treatment and/or compaction and may be performed in any suitable equipment resulting in a particle size between 10 mm and 10 μm, preferably between 5 mm and 20 μm and most preferably between 2 mm and 45 μm.

In one embodiment the filtering medium according to the present invention contains a copper containing iron-based porous and permeable composite (C) containing a compacted and optionally heat treated mixture of iron-based powder and copper based powder, and wherein said composite (C) has a porosity of 11 to 68%, preferably 23-50%, a density of 2.5-7.0, preferably 4-6 g/cm$^3$ and a particle size between 10 mm and 10 μm, preferably between 5 mm and 20 μm, most preferably between 2 mm and 45 μm.

In another embodiment the filtering medium comprising the composite (C) contains atomized iron powder, or hydrogen reduced iron powder, or CO-reduced iron powder, wherein the iron powder has a Fe content of at least 90%, preferably at least 95% by weight. If the composite (C) contains atomized iron powder, the content of copper in composite (C) preferably is 2-20% by weight. If the composite (C) contains hydrogen reduced iron powder, the content of copper in composite (C) preferably is 2-10% by weight. If the composite (C) contains CO reduced iron powder, the content of copper in the composite (C) preferably is 10-20% by weight.

One preferred method for producing a filtering medium according to the present invention, containing an iron based porous and permeable composite (C) comprises the steps of:
providing iron and copper in a form chosen from the group consisting of;
a mixture (A) containing atomized iron powder and copper content of 2-20% by weight,
a mixture (A) containing hydrogen reduced iron powder and a copper content of 2-10% by weight,
a mixture (A) containing CO-reduced iron powder and a copper content of 10-20% by weight, or
an iron copper powder alloy (B) containing 2-20% by weight of copper, compacting said iron and copper containing powder mixture (A) or alloy (B) at a compaction pressure of 10-1000 MPa to a compacted body having a density between 2.5-7 g/cm$^3$, optionally thermal treat the compacted body at a temperature of between 300-1200° C., optionally size or grind the compacted body or the compacted and thermal treated body into a particle size between 1 μm and 10 mm.

Use of the Filtering Medium

The present invention also relates to the use of the filtering medium for treatment of contaminated fluids from multiple contaminants simultaneously, wherein a fluid is allowed to pass through or be contacted with said filtering medium. The contaminated fluids are preferably in liquid form. Said fluid may be a water containing fluid, preferably ground water, river water, industrial waste water, civic waste water and/or surface water. Said fluid may be used as drinking water after purification treatment according to the present invention. Said contaminants may be selected from the group consisting of inorganic chlorine containing compositions, nitrates, nitrites, heavy metals, such as As, Pb, Hg, Cd, Se, Cr and hexavalent Cr, other toxic inorganic substances, toxic organic compounds and/or microorganisms such as bacteria; or combinations thereof.

Method for Reducing the Content of Multiple Contaminants in Fluids

The present invention also relates to a method for reducing the content of multiple contaminants in fluids which comprises the steps of obtaining the iron powder-based copper containing mixture (A) or the iron-copper alloy (B), or the permeable porous composite (C) as described above and allowing one or more contaminated fluid(s) to pass through or be contacted with a filtering medium consisting of or comprising said alloy, or said mixture or said composite, thus reducing the content of multiple contaminants simultaneously.

Said filtering medium can be placed inside a container connected to the supply system of the fluid to be treated.

Such containers could be placed serial or parallel and connected to additional containers containing other known substances for reducing the content of harmful substances in the fluid.

Said filtering medium could also be added to the water to be cleaned and after a certain time the filtering medium could be removed or the water could be decanted after which the purified water can be used.

The filtering medium according to the invention preferably has a specific surface area between 0.05 and 50, above 0.2, above 0.5 and above 1 m$^2$/g as measured by BET (Brunauer, Emmett and Teller, 1938).

A highly surprising synergetic effect is obtained with the filtering medium according to the invention, when combining certain types of copper powder particles with certain types of iron powder particles. This synergetic effect is evident by the remarkably high efficiency for removal of multiple contaminants, especially the removal of bacteria, chlorine and nitrate.

An additional advantage with the method for reducing multiple contaminants simultaneously in fluids according to the present invention is, in contrast to methods such as conventional ion exchange, that no hazardous waste is generated by the method.

Depending on the application, i.e. type of fluid to be treated and type of contaminants, different iron-based powders and different copper containing powders could be chosen in order to obtain optimal efficiency.

The filtering medium according to the present invention should have a permeability, expressed as porosity ranging from 11 to 68%, preferably 23-50%, regardless of embodiment.

One embodiment of the invention is to apply the filtering medium according to the invention to drinking water treatment, waste water (municipal and industrial) treatment and/or soil remediation.

The generated byproduct, i.e. the used filtering medium comprising the iron-copper alloy, or the iron powder-based copper containing mixture, or the porous composite, can be used in other industries, for instance as raw material for the steel industry.

In an embodiment a filtering medium for reducing the content of multiple contaminants in fluids simultaneously comprises a mixture (A) containing a major part of an iron-based powder and a minor part of a copper based powder, wherein said mixture consists of:

atomized iron powder with an average particles size between 40-μm and 150 μm in size, and with an Fe-content of at least 90% by weight of the iron powder At least one of essentially pure Cu powder particles, Fe—Cu powder particles and Cu-alloy powder particles, in a sufficient amount to ensure that the composition contains between 2 and 20% Cu, by weight of the composition.

In another embodiment a filtering medium for reducing the content of multiple contaminants in fluids simultaneously comprises a mixture (A) containing a major part of an iron-based powder and a minor part of a copper based powder, wherein said mixture consists of:

H2-reduced iron powder with an average particles size between 45 μm and 850 μm in size, and with an Fe-content of at least 90% by weight of the iron powder At least one of essentially pure Cu powder particles, Fe—Cu powder particles and Cu-alloy powder particles, in a sufficient amount to ensure that the composition contains between 2 and 10% Cu, by weight of the composition.

In yet another embodiment a filtering medium for reducing the content of multiple contaminants in fluids simultaneously comprises a mixture (A) containing a major part of an iron-based powder and a minor part of a copper based powder wherein said mixture consists of:

CO-reduced iron powder with an average particles size between 40 μm and 150 μm in size, and with an Fe-content of at least 90% by weight of the iron powder At least one of essentially pure Cu powder particles, Fe—Cu powder particles and Cu-alloy powder particles, in a sufficient amount to ensure that the composition contains between 10 and 20% Cu, by weight of the composition.

In yet another embodiment a filtering medium for reducing the content of multiple contaminants in fluids simultaneously comprises an iron-copper powder alloy(s) (B) wherein the alloy consists of iron and 2-20% of copper.

In yet another embodiment a filtering medium for reducing the content of multiple contaminants in fluids simultaneously comprises a copper containing iron based porous and permeable composite (C) prepared using at least one of said mixture (A) or alloy (B) mentioned above.

EXAMPLES

Various powder materials according to table 1, showing their properties, was used in the following examples.

TABLE 1 properties of iron and copper containing powders used in the examples.

| Materials Powder sample | type | ID | % Cu | % Fe | AD, g/cm3 | SSA, m2/kg | Particle size distribution |
|---|---|---|---|---|---|---|---|
| pure iron | H-reduced | A | 0 | >96 | 1.22 | 225 | 80% > 100 um |
| | CO-reduced | B | 0 | >97 | 2.45 | 100 | 80% < 100 um |
| | Atomized | C | 0 | >98 | 2.95 | 50 | 80% < 100 um |
| Originating from copper oxide | reduced | D | 84 | 0.2 | 2.89 | 160 | 100% < 45 um |
| pure copper | atomized | E | 100 | 0.2 | 2.89 | 80 | 100% < 100 um |
| | electrolytic | F | 100 | 0.12 | 1.68 | 100 | 100% < 100 um |
| alloyed copper | bronze | G | 90 | 0.14 | 2.48 | 70 | 100% < 100 um |
| | brass | H | 90 | 0.15 | 3.12 | 80 | 100% < 100 um |

Apparent Density (AD):

The density when powder is in the loose state without agitation. It is measured by Hall flowmeter which consist of a funnel and measuring cup, where the powder passes through the funnel and flows into the cup. (ASTM B 212 and ASTM B 417)

Particle Size Distribution (PSD):

Particle size distribution data as expressed by the weight percentage of powder retained on each of a series of sieves of decreasing size (increasing mesh). (ASTM B 214)

Specific Surface Area (SSA):

The external powder area per unit weight of powder as measured by gas absorption (BET method).

% Fe and % Cu:

The content of iron and copper elements in the powder. It is determined by a inductively coupled plasma mass spectrometry (ICP-MS method)

Test Methods

The following analytical and testing methods for evaluation of the capability for reducing contaminants in water were used in the examples:

Bacteria (E-Coli) Test:

100 g of powder medium was added to 250 ml water containing standard E. Coli bacteria and mixed by shaking for 10 min. After the powder medium settled, 100 ml treated water was taken for bacteria Presence/Absence test. One packet of reagent (IDEXX Laboratories) was added to the water sample in a sterile, non-fluorescing vessel and mixed by shaking and incubate at 35° C. for 24 h. The results were read at 24 h by placing a 6 W, 365 nm UV light within 5 inches of the sample. If yellow color, the test was negative (no bacteria exist). If blue fluorescence was observed, the presence of E. coli was confirmed. (USA National Environmental Methods Index 68585-22-2)

Chlorine Reduction:

100 g powder medium was added in 250 ml water containing ~5 mg/L ClO⁻ by the addition of bleach solution with ~6% sodium hypochlorite). The medium was mixed with the water by stirred gently for 10 min. The amounts of chlorine in raw and treated water were determined by spectrophotometer (Hach DR5000) and the percentage of chlorine reduction was calculated.

Nitrate Reduction:

100 g powder medium was added to 250 ml groundwater containing ~16 mg/L-N nitrate (Martinsburg, Pa., USA). The medium was mixed with the water by gently stirring for 5 hours. The amount of nitrate in raw and treated water was determined by spectrophotometer (Hach DR5000) and the percentage of nitrate reduction was calculated.

Multiple Contaminant Reduction Efficiency (MCRE):

In order to compare the efficiency of the tested filter medium an index was calculated according to the following formula:

MCRE=(% Bacteria reduction+% Chlorine reduction+% Nitrate reduction)/3 wherein the % Bacteria reduction is either 0 or 100. The MCRE is intended to quantify the efficiency of multiple contaminant simultaneous reduction, and is expressed in %, thus 100 is the highest level of efficiency.

The value is intended purely for comparison purposes, since in practice, one contaminant may be of more importance to remove than another.

Example 1 (Comparative)

As reference examples, the powder samples according to table 2 were tested individually for their ability of reducing bacteria, chlorine and nitrate. The tests were performed according to the earlier described testing methods. Table 2 shows powder samples used and the results.

TABLE 2

| Powder sample | Type | ID | Cu % | Bacteria killer % | Chlorine reduction % | Nitrate reduction % | MCRE % |
|---|---|---|---|---|---|---|---|
| pure iron | H-reduced | A | 0 | 0 | 98 | 6 | 35 |
| | CO-reduced | B | 0 | 0 | 100 | 14 | 38 |
| | atomized | C | 0 | 0 | 68 | 11 | 26 |

TABLE 2-continued

| Powder sample | Type | ID | Cu % | Bacteria killer % | Chlorine reduction % | Nitrate reduction % | MCRE % |
|---|---|---|---|---|---|---|---|
| pure copper & alloyed copper | reduced | D | 100 | 100 | 89 | 4 | 64 |
| | atomized | E | 100 | 100 | 87 | 3 | 63 |
| | electrolytic | F | 100 | 100 | 47 | 1 | 49 |
| | bronze | G | 90 | 100 | 83 | 1 | 61 |
| | brass | H | 90 | 100 | 100 | 2 | 67 |

The table above shows that iron powder, in contrast to copper powder, cannot kill bacteria. Surprisingly it is shown that these iron powders can reduce chlorine in the same level as copper. Iron powder can reduce nitrate to a higher extent than copper powder, but still on a low level.

Example 2

Mixtures of a major part of an iron-based powder and a minor part of a copper based powder were prepared. As reference examples pure reduced and pure atomized powders were used. The mixtures were evaluated for their removal efficiency with respect to bacteria, chlorine and nitrate. The removal efficiency was calculated as MCRE. The mixtures were evaluated according to the testing methods.

The table shows pure iron powder by itself can not kill bacteria and have an insignificant effect of the reduction of nitrate. When copper is mixed to the pure iron powder the surprising synergetic effect for the reduction of chlorine and nitrate is observed.

When using a CO reduced iron powder the content of copper must be above 5% by weight for obtaining a satisfactory bacteria killing effect, an acceptable nitrate and chlorine reduction. All mixtures according to the invention show MCRE values above 70%.

For the combination of atomized powder and copper, a content of copper above 20% by weight is not considered to be cost effective since the performance is not improved; a content below 2% by weight may negatively influence the bacteria killing effect. Thus, the preferred range is 2-20% Cu, by weight of the powder mixture. The same conclusions apply for CO-reduced powders, except the lower limit is above 5% by weight, e.g. 10-20% Cu, by weight.

TABLE 3

| Category | sample | ID | Cu % | Bacteria killer % | Chlorine reduction % | Nitrate reduction % | MCRE % |
|---|---|---|---|---|---|---|---|
| Pure iron (comparative) | H-reduced | A | 0 | 0 | 98 | 6 | 35 |
| Pure iron (comparative) | CO-reduced | B | 0 | 0 | 100 | 14 | 38 |
| Pure iron (comparative) | atomized | C | 0 | 0 | 68 | 11 | 26 |
| Copper containing (comparative) | CO-reduced, mix | BE1 | 5 | 0 | 90 | 43 | 44 |
| Copper containing (invention) | CO-reduced, mix | BE2 | 10 | 100 | 89 | 43 | 77 |
| Copper containing (invention) | CO-reduced, mix | BE3 | 20 | 100 | 96 | 35 | 77 |
| Copper containing (comparative) | CO-reduced, mix | BE4 | 25 | 100 | 83 | 24 | 69 |
| Copper containing (comparative) | H-reduced, mix | AE1 | 1 | 0 | 97 | 29 | 42 |
| Copper containing (invention) | H-reduced, mix | AE2 | 2 | 100 | 95 | 66 | 87 |
| Copper containing (invention) | H-reduced, mix | AE3 | 8 | 100 | 88 | 74 | 87 |
| Copper containing (comparative) | H-reduced, mix | AE4 | 12 | 0 | 84 | 68 | 51 |
| Copper containing (comparative) | Atomized, mix | CE1 | 1 | 0 | 69 | 50 | 40 |
| Copper containing (invention) | Atomized, mix | CE2 | 2 | 100 | 73 | 58 | 77 |
| Copper containing (invention) | Atomized, mix | CE3 | 5 | 100 | 66 | 55 | 74 |
| Copper containing (invention) | Atomized, mix | CE4 | 10 | 100 | 58 | 56 | 71 |
| Copper containing (invention) | Atomized, mix | CE5 | 20 | 100 | 72 | 54 | 75 |
| Copper containing (comparative) | Atomized, mix | CE6 | 30 | 100 | 70 | 36 | 69 |

Regarding H-reduced powders, it was found that the optimal copper content was 2-10% by weight, as indicated in the results in table 3.

Example 3

Filtering medium containing iron-copper powder alloys according to the invention were used. As reference examples pure reduced and pure atomized powders were used. The mixtures were evaluated for their removal efficiency with respect to bacteria, chlorine and nitrate according to the testing methods. The combined removal efficiency was calculated as MCRE. The alloys were prepared by bonding copper to iron through diffusion-bonding process.

TABLE 4

| Category | sample | ID | Cu % | Bacteria killer % | Chlorine reduction % | Nitrate reduction % | MCRE % |
|---|---|---|---|---|---|---|---|
| pure iron (comparative) | H-reduced | A | 0 | 0 | 98 | 6 | 35 |
| pure iron (comparative) | CO-reduced | B | 0 | 0 | 100 | 14 | 38 |
| pure iron (comparative) | atomized | C | 0 | 0 | 68 | 11 | 26 |
| Copper containing (comparative) | H-reduced, diff-bond | AD1 | 1 | 0 | 66 | 28 | 31 |
| Copper containing (invention) | H-reduced, diff-bond | AD2 | 2 | 100 | 54 | 61 | 72 |
| Copper containing (invention) | H-reduced, diff-bond | AD3 | 10 | 100 | 42 | 48 | 63 |
| Copper containing (comparative) | H-reduced, diff-bond | AD4 | 15 | 0 | 44 | 32 | 25 |
| Copper containing (invention) | CO-reduced, diff-bond | BD1 | 10 | 100 | 80 | 65 | 82 |
| Copper containing (comparative) | CO-reduced, diff-bond | BD2 | 25 | 100 | 32 | 70 | 67 |
| Copper containing (invention) | Atomized, diff-bond | CD1 | 10 | 100 | 76 | 62 | 79 |

The table shows pure iron powder by itself can not kill bacteria and have an insignificant effect of the reduction of nitrate. When iron-copper powder alloys are used the surprising synergetic effect for the reduction of chlorine and nitrate is observed, thus the filtering medium according to the invention can simultaneously reduce bacteria, chlorine and nitrate. All alloys according to the invention show MCRE values above 60%.

For the combination of atomized powder and copper, a content of copper above 20% is not considered to be cost effective since the performance is not improved, a content below 2% may negatively influence the bacteria killing effect. Thus, the preferred range is 2-20% Cu, by weight of the alloy.

Regarding CO-reduced powders, it was found that the optimal copper content was 10-20% Cu by weight.

Regarding H-reduced powders, it was found that the optimal copper content was 2-10% by weight, as indicated in the results.

Example 4

Filtering medium containing iron-copper powder alloys according to the invention were prepared. As reference examples pure reduced and pure atomized powders were used. The mixtures were evaluated for their removal efficiency with respect to bacteria, chlorine and nitrate according to the testing methods. The removal efficiency was calculated as MCRE.

The alloys were prepared by prealloying copper to iron through diffusion alloying or through added copper to the melt before atomizing.

TABLE 5

| Category | sample | ID | Cu % | Bacteria killer % | Chlorine reduction % | Nitrate reduction % | MCRE % |
|---|---|---|---|---|---|---|---|
| Pure iron (comparative) | H-reduced | A | 0 | 0 | 98 | 6 | 35 |
| Pure iron (comparative) | CO-reduced | B | 0 | 0 | 100 | 14 | 38 |
| Pure iron (comparative) | atomized | C | 0 | 100 | 68 | 11 | 40 |
| Copper containing (comparative) | H-reduced, diff-alloy | AE5 | 1.5 | 0 | 85 | 56 | 47 |

TABLE 5-continued

| Category | sample | ID | Cu % | Bacteria killer % | Chlorine reduction % | Nitrate reduction % | MCRE % |
|---|---|---|---|---|---|---|---|
| Copper containing (invention) | H-reduced, diff-alloy | AE6 | 5 | 100 | 93 | 86 | 93 |
| Copper containing (invention) | H-reduced, diff-alloy | AE7 | 10 | 100 | 100 | 87 | 96 |
| Copper containing (invention) | CO-reduced, diff-alloy | BD3 | 10 | 100 | 100 | 68 | 89 |
| Copper containing (invention) | Atomized, diff-alloy | CE7 | 5 | 100 | 92 | 69 | 87 |
| Copper containing (invention) | Atomized, diff-alloy | CE8 | 10 | 100 | 95 | 63 | 86 |
| Copper containing (invention) | Atomized, Prealloy in melt | CE9 | 20 | 100 | 70 | 63 | 78 |
| Copper containing (comparative) | Atomized, Prealloy in melt | CE10 | 25 | 100 | 57 | 48 | 68 |

The table shows pure iron powder by itself can not kill bacteria and have an insignificant effect of the reduction of nitrate. When iron-copper powder alloys are used the surprising synergetic effect for the reduction of chlorine and nitrate is observed, thus the filtering medium according to the invention can simultaneously reduce bacteria, chlorine and nitrate. All alloys according to the invention show MCRE values above 70%.

For the combination of atomized powder and copper, a content of copper above 20% is not considered to be cost effective since the performance is not improved, a content below 2% may negatively influence the bacteria killing effect. Thus, the preferred range is 2-20% Cu, by weight of the alloy.

Regarding CO-reduced powders, it was found that the optimal copper content was 10-20% Cu by weight.

Regarding H-reduced powders, it was found that the optimal copper content was 2-10% by weight, as indicated in the results.

Example 5

Filtering medium according to the invention were prepared by mechanically alloying pure iron based powder particles with copper powder. As a reference pure atomized iron powder was used.

TABLE 6

| Category | sample | ID | Cu % | Bacteria killer % | Chlorine reduction % | Nitrate reduction % | MCRE % |
|---|---|---|---|---|---|---|---|
| Pure iron (comparative) | atomized | C | 0 | 0 | 68 | 11 | 26 |
| Copper containing (invention) | Atomized, Mechalloy | CE11 | 5 | 100 | 93 | 65 | 86 |
| Copper containing (comparative) | Atomized, Mechalloy | CE12 | 11 | 0 | 87 | 55 | 47 |

Table 6 shows that in contrast to pure iron powder a mechanically alloyed iron-copper powder can reduce nitrate, kill bacteria and improve the efficiency for reduction of chlorine. It can also be seen in table 6 that the optimal copper content when alloying mechanically is 2-10% by weight of the alloy.

Example 6

A sample of natural occurring water, ground water from Martinsburg, Pa., USA, was used. The sample was spiked with $E$-$coli$ bacteria, arsenic and chlorine (5 mg/L ClO— by adding bleach solution with ~6% sodium hypochlorite). Table 7 shows the properties of the ground water sample.

The test was performed by pumping the water into a column having a test material, as shown in FIG. 1. The empaty bed contact time, EBCT, was 30 minutes. The effluent water was analyzed with regards to contaminants after certain time intervals. The content of contaminants at 0 hours is equal to the content in the non treated water (influent). 100 g filter medium consisting of H-reduced iron powder diffusion-alloyed with 10% copper was used.

The concentrations of different contaminants in the water passing the column after various time intervals are shown in table 8.

TABLE 7

| | |
|---|---|
| Nitrate [mg/l] (as N) | 18.7 |
| pH | 7.27 |
| Alkalinity [mg/l] | 158 |
| Acidity [mg/l] | <1.0 |
| Total hardness [mg/l] | 340 |
| Conductivity [mS/cm] | 3250 |

TABLE 8

| | Nitrate | | Arsenic | | chlorine | | E-coli bacteria | |
|---|---|---|---|---|---|---|---|---|
| Hours | (N) mg/l | % reduction | mg/l | % reduction | (Cl2) mg/l | % reduction | Yes +, No − | % reduction |
| 0 | 18.7 | 0 | 1.2222 | 0 | 4.51 | 0 | + | 0 |
| 3 | 5.65 | 60.2 | 0.0097 | 99.2 | 0.0 | 100 | − | 100 |
| 6 | 3.06 | 78.5 | 0.0026 | 99.8 | 0.01 | 99.9 | − | 100 |
| 9 | 2.2 | 84.5 | 0.0018 | 99.9 | 0.01 | 99.9 | − | 100 |
| 12 | 1.02 | 92.8 | 0.0010 | 99.9 | 0 | 100 | − | 100 |
| 24 | 1.35 | 90.5 | 0.0009 | 99.9 | 0.01 | 99.9 | − | 100 |
| 28 | 1.56 | 89.0 | 0.0008 | 99.9 | 0.01 | 99.9 | − | 100 |
| 32 | 1.11 | 92.2 | 0.0016 | 99.9 | 0.01 | 99.9 | − | 100 |
| 48 | 1.06 | 92.5 | 0.0012 | 99.9 | 0.0 | 100 | − | 100 |

As can be seen in table 8, the filter medium according to the invention effectively removes multiple contaminants in the water, in this case arsenic, chlorine, nitrates and *E-coli* bacteria.

Example 7

Figure 4:
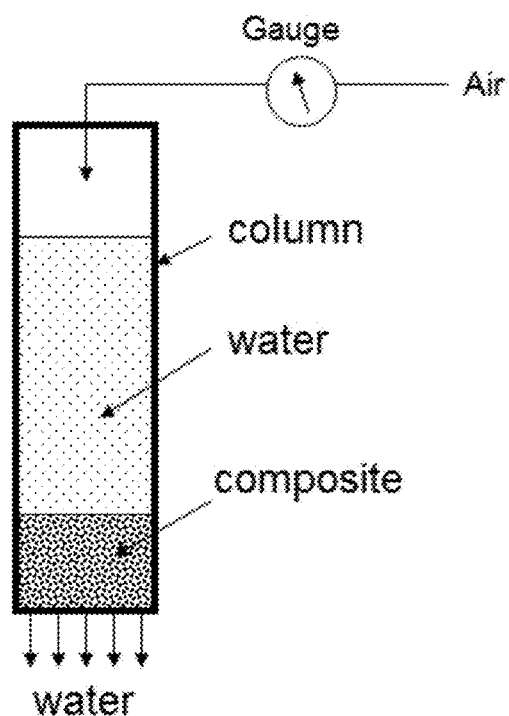
FIG. 4 shows the test equipment and set up of Example 7.

This example shows how the minimum and maximum required porosity for the permeable porous composite was measured. An iron powder which is suitable to be used for producing the permeable porous composite according to the invention was tested. The test equipment and set-up were illustrated in FIG. 4.

The iron powder, H-reduced iron powder according to table 1, was mixed with 10% copper powder, atomized copper powder according to table 1. The mix was compacted into 25 mm diameter and 20 mm height cylinders of composite with different densities. The densities were measured according to SS EN ISO 2738.

The composites to be tested were placed in the column and water was forced to pass through under different pressures. The amount of water penetrating through the test material was measured as milliliter water after the pressure was applied for 5 minutes.

The porosity was measured according to standard test methods for metal powders and powder metallurgy products (MPIF 2007 edition), more specifically MPIF Standard no. 57 for determining oil content and interconnected porosity of sintered powder metallurgy products. The determination of the interconnected porosity was made by determining the mass of the oil-free test specimen (mass A), the fully impregnated test specimen (mass B), the mass of the oil impregnated specimen and test specimen support immersed in water (mass C), the mass of the test specimen support in water (mass E), the density of the oil ($\rho_o$) and the density of water at the immersion temperature ($\rho_w$). The interconnected porosity is calculated by volume. %, from the following formula:

$$\text{Interconnected porosity } (P) = \left[ \frac{B - A}{(B - C + E) * \rho_o} * 100 \right] \rho_w$$

where:

$\rho_o$=density of the as received oil, g/cm$^3$ $\rho_w$=density of water at the immersion temperature, g/cm$^3$ A=mass in air of oil-free specimen, g B=mass of oil impregnated specimen, g C=mass of oil impregnated specimen and test specimen support immersed in water, g D=mass of test specimen support immersed in water, g The following table shows that the porosity of the permeable porous composite has to be more than about 11%. This is evident by Test 1 to 8. With a porosity of 10.7%, water cannot pass through the composite at any applied pressures (Test 1). With a porosity of 11.5%, water passes through the composite at a minimal pressure of 5 psi or 0.03 MPa (Test 2). A composite with a higher porosity can provide higher permeability of water (Test 3 to 8). The maximum porosity of a composite according to this invention is about 68%. When the porosity is more than 68%, the copper containing iron powder mixture cannot be held together to form a composite in a certain shape. With the porosity between 23% and 50%, a composite can achieve good composite strength and excellent permeability.

Therefore, the required porosity for the composites according to the invention is 11% to 68%, preferably 23% to 50% in order to manufacture a permeable porous composite.

TABLE 9

| | Test | | | | | | | | |
|---|---|---|---|---|---|---|---|---|---|
| | 1 | 2 | 3 | 4 | 5 | 6 | 7 | 8 | 9 |
| density, g/cm$^3$ | 7.12 | 7.05 | 6.98 | 6.57 | 6.15 | 5.53 | 3.96 | 2.55 | 2.45 |
| porosity, % vol | 10.7 | 11.5 | 12.4 | 17.6 | 22.8 | 30.6 | 50.3 | 68 | 69.2 |
| heat treatment | No | No | No | No | No | No | No | Yes | Yes |
| Composite strength | very good | very good | very good | good | good | good | good | poor | not structural |
| pressure, psi/Mpa | ml water after 5 min | ml water after 5 min | ml water after 5 min | ml water after 5 min | ml water after 5 min | ml water after 5 min | ml water after 5 min | ml water after 5 min | ml water after 5 min |
| 0/0 | 0 | 0 | 0 | 0 | 0 | 2 | 76 | >100 | NA |
| 5/0.034 | 0 | 1 | 1 | 2 | 5 | 12 | >100 | >100 | NA |
| 10/0.069 | 0 | 2 | 3 | 5 | 13 | 55 | >100 | >100 | NA |
| 20/0.138 | 0 | 3 | 6 | 8 | 34 | >100 | >100 | >100 | NA |
| permeability | not permeable | good | good | good | excellent | excellent | excellent | excellent | NA |

The invention claimed is:

1. A filtering medium for reducing the content of contaminants in fluids, wherein said filtering medium comprises iron and copper in a form of:
 a powder mixture (A) containing a major part of an iron-based powder and a minor part of a copper based powder,
 wherein the mixture (A) contains atomized iron powder, the atomized iron powder having an average particle size between 40 and 150 µm, an apparent density of above 2.5 g/cm$^3$ and an Fe-content of at least 90% by weight of the iron powder, the content of copper in mixture (A) is 2-20% by weight, and the filtering medium of powder mixture (A) having a specific surface area between 0.05 and 50 m$^2$/g.

2. A filtering medium according to claim 1, wherein the iron powder of the mixture (A) has a Fe content of minimum 95% by weight.

3. A filtering medium according to claim 1, wherein the copper based powder of the mixture (A) is selected from at least one of essentially pure Cu powder particles and Cu-alloy powder particles.

4. A filtering medium according to claim 1, wherein said copper based powder of the mixture (A) comprises Cu-alloy powder particles selected from the group consisting of Fe—Cu, Cu—Sn, Cu—Zn, Cu—Al, Cu—Si, and Cu—Ni.

5. A filtering medium according to claim 1, wherein the mixture (A) contains water atomized powder.

6. A filtering medium according to claim 1, wherein the filtering medium has a porosity of 11 to 68%.

7. A filtering medium according to claim 1,
 wherein the filtering medium is configured for reducing the content of contaminants in water.

8. A method for reducing the content of contaminants in a fluid comprising the steps of:
 a) providing a filtering medium according to claim 1, and
 b) bringing one or more contaminated fluid(s) in contact with the filtering medium to reduce the content of contaminants in said one or more fluid(s).

9. A method according to claim 8, wherein in step b) one or more contaminated fluid(s) is/are allowed to pass through the filtering medium.

10. A method according to claim 8, wherein said fluid(s) is/are contaminated by at least one of inorganic chlorine containing compounds, nitrates, nitrites, heavy metals or micro-organisms.

11. A method according to claim 10, wherein said fluid(s) is/are contaminated by inorganic chlorine containing compounds, wherein the inorganic chlorine containing compound is chosen from the group consisting of hypochlorite (ClO$^-$), chlorite (ClO$_2^-$), chlorine dioxide (ClO$_2$), chlorate (ClO$_3^-$), and perchlorate (ClO$_4^-$).

12. A method according to claim 10, wherein said fluid(s) is/are contaminated by micro-organisms, wherein the micro-organisms are bacteria.

13. A method for producing a filtering medium comprising iron and copper in a form of:
 a powder mixture (A) containing a major part of an iron-based powder and a minor part of a copper based powder,
 wherein
 the mixture (A) is obtained by mixing atomized iron powder with at least one of essentially pure Cu powder particles or Cu-alloy powder particles wherein the mixture (A) contains atomized iron powder having an average particle size between 40 and 150 µm and the filtering medium of powder mixture (A) has a specific surface area between 0.05 and 50 m$^2$/g; and where the content of copper in mixture (A) is 2-20% by weight.

* * * * *